(12) United States Patent
Iwashita

(10) Patent No.: US 6,840,355 B2
(45) Date of Patent: Jan. 11, 2005

(54) ROTARY DAMPER DEVICE

(75) Inventor: Hiroyuki Iwashita, Simosuwa-machi (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 0 days.

(21) Appl. No.: 10/316,195

(22) Filed: Dec. 10, 2002

(65) Prior Publication Data

US 2003/0126717 A1 Jul. 10, 2003

(30) Foreign Application Priority Data

Dec. 12, 2001 (JP) ........................................ 2001-378104

(51) Int. Cl.$^7$ .............................................. F16D 57/00
(52) U.S. Cl. ...................... 188/290; 188/293; 188/306
(58) Field of Search ............................... 188/290, 306, 188/293, 295, 296, 308, 294

(56) References Cited

U.S. PATENT DOCUMENTS

| | | | | | |
|---|---|---|---|---|---|
| 1,426,115 | A | * | 8/1922 | Shultz | 188/288 |
| 1,521,602 | A | * | 1/1925 | Derihon | 188/307 |
| 1,630,737 | A | | 5/1927 | Flanders | 464/24 |
| 1,778,905 | A | | 10/1930 | Mitchell | 267/223 |
| 1,807,945 | A | * | 6/1931 | Trumble | 188/306 |
| 1,871,956 | A | * | 8/1932 | Chryst | 188/288 |
| 1,876,862 | A | * | 9/1932 | Cross | 188/283 |
| 1,970,369 | A | * | 8/1934 | Focht | 188/306 |
| 2,054,466 | A | * | 9/1936 | Peo | 188/306 |
| 2,314,493 | A | * | 3/1943 | Guy | 188/306 |
| 3,653,228 | A | | 4/1972 | Tiberio | 464/24 |
| 4,098,597 | A | | 7/1978 | Nebelung | 65/181 |
| 4,411,341 | A | * | 10/1983 | Schultz | 188/310 |
| 5,064,033 | A | | 11/1991 | Koike et al. | 188/306 |
| 5,152,189 | A | * | 10/1992 | Miura et al. | 74/573 F |
| 5,697,122 | A | | 12/1997 | Okabe et al. | 16/82 |
| 5,720,370 | A | | 2/1998 | Takahashi | 188/310 |
| 6,318,522 | B1 | | 11/2001 | Johnston et al. | 188/267.2 |
| 6,390,255 | B2 | | 5/2002 | Kobori et al. | 188/290 |

FOREIGN PATENT DOCUMENTS

| | | |
|---|---|---|
| JP | 07-301272 | 11/1995 |
| JP | 2000-120747 | 4/2000 |
| JP | 2000-161412 | 6/2000 |
| JP | 2000-199536 | 7/2000 |

* cited by examiner

Primary Examiner—Robert A. Siconolfi
(74) Attorney, Agent, or Firm—Hogan & Hartson, LLP

(57) ABSTRACT

A rotary damper device includes a case in which a viscous fluid is filled and sealed, a rotation shaft relatively rotatably supported by the case, a rotation vane formed protruded from the rotation shaft, and a check valve mounted on a tip part of the rotation vane. A passage where the viscous fluid passes through is formed in the rotation vane. The check valve is provided with an opposing face part facing the passage and a frame body interposing the rotation vane. An elastic member for energizing the opposing face part of the check valve for closing the passage of the rotation vane is formed in either the rotation vane or the opposite side of the frame body of the opposing face part.

8 Claims, 4 Drawing Sheets

(a)

(b)

(c)

ROTARY DAMPER DEVICE

BACKGROUND OF THE INVENTION

1. Field of the Invention

The present invention relates to a rotary damper device, and more particularly to a rotary damper device that is used in a rotational cover or a rotational door.

2. Description of the Related Art

A conventional rotary damper device is generally constituted in such a manner that a rotor shaft mounted with a check valve is enclosed in a case in which oil is filled, and a cover is tightly fitted and fixed to the case by screws, supersonic wave welding or the like. Such a rotary oil damper device is used not only in a rotational cover or a rotational door but also as a damper device regulating the rotating or swinging speed of a toilet seat and/or a seat lid. When the toilet seat/seat lid with the damper device is moved in a closing direction from an opened state, a rotor shaft rotates with the toilet seat to make a check valve mounted to the rotor shaft tightly contact with a vane of the rotor shaft. The vane is provided with an orifice, which is closed by the check valve abutting against the vane to restrict the flow of oil, and thus, the toilet seat/seat lid is slowly closed.

When the toilet seat/seat lid is moved in an open direction from the closed state, the rotor shaft is rotated or swung, and the check valve attached to the rotor shaft is released from the contacting state with the vane. As a result, the orifice formed in the vane is opened so that the oil can move without resistance and the toilet seat/seat lid can be easily opened.

However, check valves in the prior-art have various problems that need to be solved. For example, a conventional check valve is formed substantially U-shaped and is movable until the right or left butting part of the check valve abuts against the vane. In this type of check valve, since the check valve can move in either direction by oil resistance as the rotor shaft moves, it requires some time for the check valve to close the orifice of the vane. This period causes a slip angle that does not work as a damper function for the rotor shaft. In the case of the slip angle being large, when a toilet seat is opened halfway and released, the toilet seat may collide with the toilet stool bowl. Also, the large slip angle causes variations in angle when the toilet seat is braked.

A damper device without a backlash, is complicated and requires a lot of components. Also, a rotary damper is a damper in which the slip angle is reduced by using a spring, but many components are required and its assembling workability is not satisfactory.

A device in which a viscous fluid pressure receiving part is provided with elasticity is also known in the prior art. However, with this device, the elastic deformation part is formed in the portion to which a high pressure of viscous fluid is applied causes a problem of its durability.

SUMMARY OF THE INVENTION

It is an advantage of the present invention to provide a rotary damper device capable of preventing a slip angle (backlash) and quickly operating a braking or damper function with a simple constitution at a low cost.

In accordance with an embodiment of the present invention, a damper device may include a case in which a viscous fluid is filled and sealed, a rotation shaft rotatably supported by the case, a rotation vane formed protruded from the rotation shaft and a check valve mounted on the tip part of the rotation vane, wherein a passage where the viscous fluid passes through is formed in the rotation vane, the check valve is provided with an opposing face part facing the passage and a frame body interposing the rotation vane, and an elastic member for energizing so that the opposing face part of the check valve closes the passage of the rotation vane formed in either of the rotation vane or the opposite bide of the frame body of the opposing face part.

As a result, with a simple constitution, when the rotation shaft is rotated in a damper operating direction, the opposing face part of the check valve closes the passage of the fluid in the rotation vane and, when the rotation shaft is turned in the opposite direction, in other words, in a slipping direction, the opposing face part of the check valve opens the passage of the fluid by the flowing pressure of the viscous fluid.

In the present invention, when the elastic member is integrally formed with the frame body of the check valve opposite the opposing face part so as to abut the rotation vane, the constitution can be further simplified.

Preferably, the elastic member is integrally formed with the frame body by using a synthetic resin with oil resistance and wear resistance, and may be formed in a feeler shape, a T-shape, an arch-shape, a truncated chevron shape, or the like.

Preferably, a regulating part is formed between the rotation vane and the opposite side of the frame body to the opposing face part for restricting the amount of elastic deformation of the elastic member. When the regulating part is provided, the elastic member is elastically doformed within the predetermined range of elasticity and thus a stable operation can be performed for a long period.

The regulating part may be formed by protruding from the rotation vane or by protruding from the frame body. Also, when the regulating part is constituted of two protrusion parts and the elastic member is formed between them, the elastic member can be protected with the two protrusion parts and thus a reliable operation can be attained with a simple construction.

BRIEF DESCRIPTION OF THE DRAWINGS

FIG. 3 shows operation explanatory views of a check valve at a braking time in the damper device shown in FIG. 1, wherein FIG. 3(a) shows a cross-sectional view perpendicular to the shaft and FIG. 3(b) shows a longitudinal sectional view along the shaft.

FIG. 4 shows operation explanatory views of the check valve at a slipping time in the damper device shown in FIG. 1, wherein FIG. 4(a) shows a cross-sectional view perpendicular to the shaft and FIG. 4(b) shows a longitudinal sectional view along the shaft.

FIG. 5 shows perspective views of check valves each of which is integrally formed with an elastic member in accordance with other embodiments of the present invention, wherein FIG. 5(a) shows a T-shaped elastic member, FIG. 5(b), an arch-shaped elastic member and FIG. 5(c), two bar-shaped elastic member.

DETAILED DESCRIPTION OF THE PREFERRED EMBODIMENTS

Figure 1:
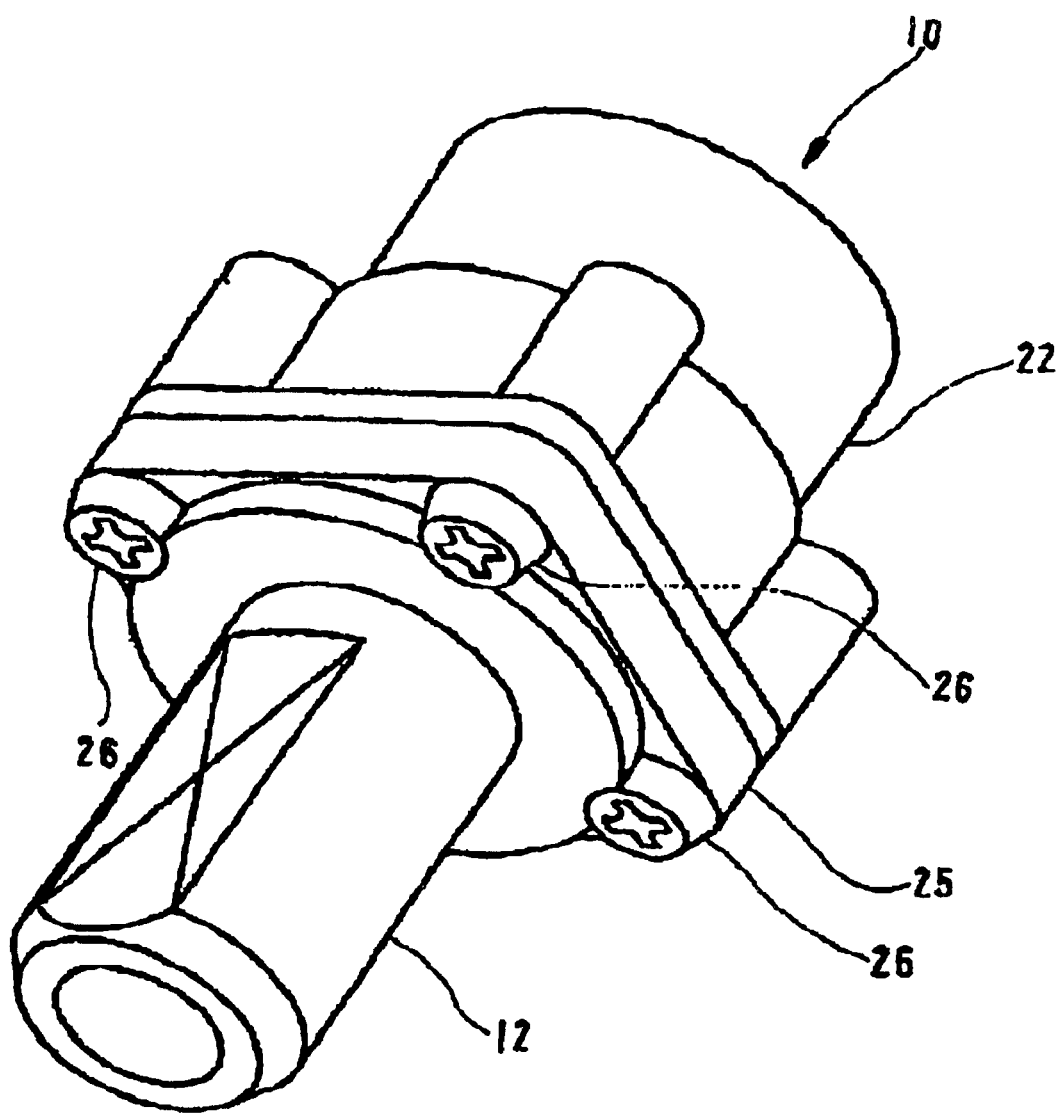
FIG. 1 shows a perspective view of a damper device in accordance with one embodiment of the present invention.
Figure 2:
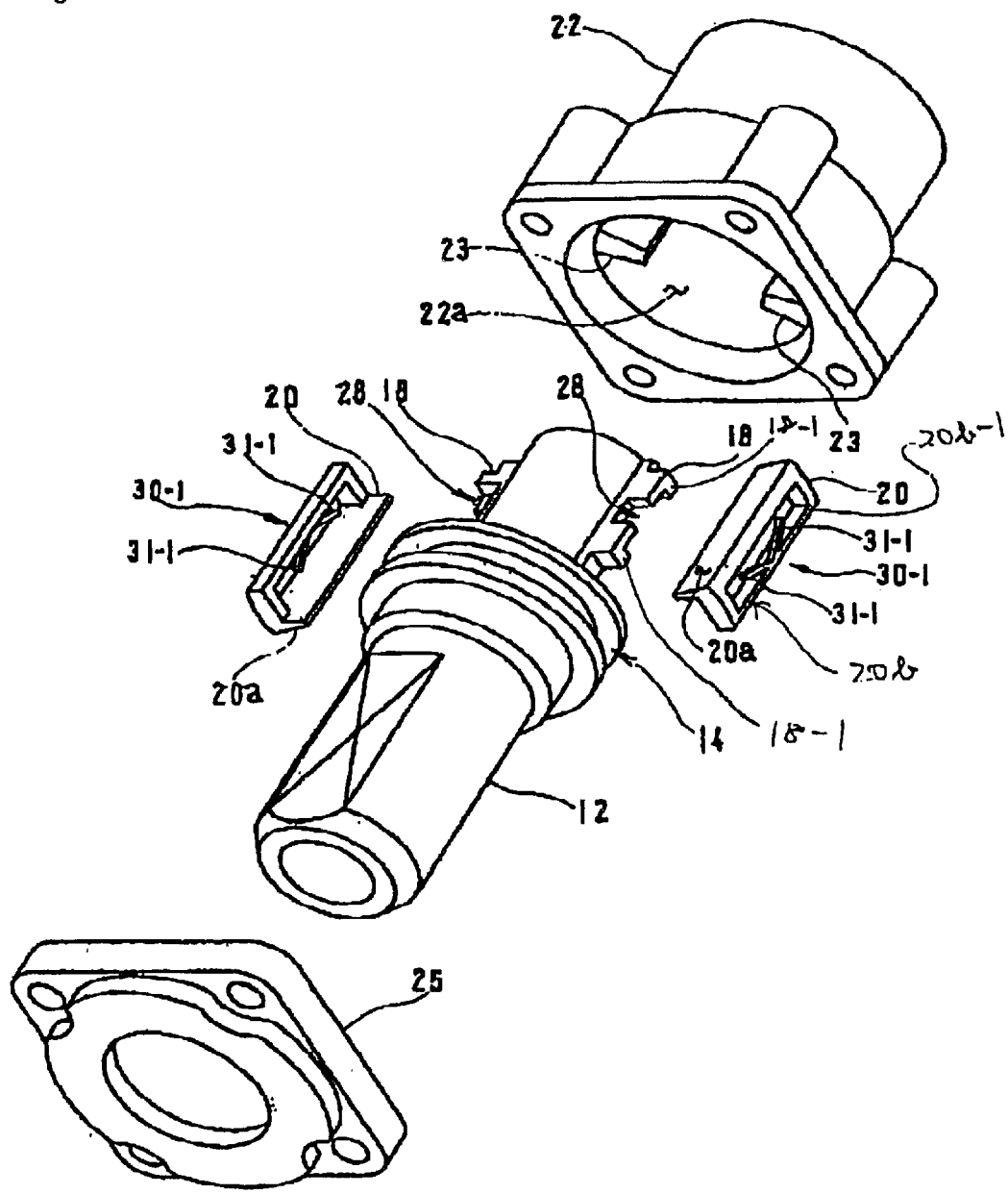
FIG. 2 shows an exploded perspective view of the damper device shown in FIG. 1.

A damper device in accordance with one embodiment of the present invention is described below with reference to the accompanying drawings. FIG. 1 shows a perspective view of a damper device in accordance with one embodiment of the present invention and FIG. 2 shows an exploded perspective view of the damper device shown in FIG. 1.

A reference number 10 shows a damper device. The damper device 10 is constituted in such a manner that an O-ring 16 is fitted in an annular groove 14 formed on a rotation shaft 12 (see FIG. 3). A check valve 20 is respectively held on a tip part of two rotation vanes 18 symmetrically projected in a radial direction and inserted into inside a case 22 having a bottom, and a specified amount of silicone oil as a viscous fluid is filled within the case 22. Partition parts 23 located symmetrically apart 180 degrees each other are projected toward the center direction from the cylindrical inner wall surface 22a of the case 22. The height of the partition part 23 is determined so that the inner end of the partition parts 23 sides roughly on the outer surface of the rotation shaft 12. The space formed by the partition parts 23 is divided into two chambers of a pressure applied oil chamber 24a and a pressure reduced oil chamber 24b by the rotation vane 18.

A cover 25 is fixed to enclose the case 22 by screws 26 to prevent the oil from leaking. Sealing and fixing can be performed by ultrasonic wave adhesion when the case 22 is formed of a synthetic resin. When the check valve 20 is mounted to the rotation shaft 12, providing a simple slip-off preventing part such as a snap fitting may preferably prevent the check valve 20 from falling off the rotation vane 18, which improves assembling workability. The check valve 20 is integrally formed with a pair of elastic protrusion parts 30-1 as an elastic member for energizing the check valve 20 in such a direction that an oil passage 28 formed in the rotation vane 18 is closed.

The oil passage 28 is a notch part formed concavely at the outer peripheral side of the central portion of the rotation vane 18, which is formed like a flat plate-shape in an axial direction. The check valve 20 is provided with an opposing face part 20a for closing the oil passage 28, and with a frame body 20b formed to interpose and surround the tip part of the rotation vane 18. A frame connecting part 20b-1 connecting both end parts of the frame body 20b in the axial direction of the rotation shaft 12 is formed on the opposite side to the opposing face part 20a. The elastic protrusion parts 30-1 are formed on the fame connecting part 20b-1, which serves also to prevent the check valve 20 from falling off the rotation vane 18.

The elastic protrusion parts 30-1 are formed in a V-shaped leg section 31-1 as a first embodiment and so constituted that the end parts are abutted and pushed against the wall face of the rotation vane 18 even at a stopping state. Therefore, at a stopping state when a rotating operation is not executed, the frame connecting part 20b-1 is positioned apart from the rotation vane 18 by the elastic force of the elastic protrusion parts 30-1. As a result, the opposing face part 20a of the check valve 20 is positioned to close the oil passage 28. On the contrary, even though the opposing face part 20a does not completely dose the oil passage 28 at a stopping state, the operation can be satisfactorily performed because the slip angle is extremely reduced. In other words, at a stopping state, it is not necessary for the tip ends of the elastic protrusion parts 30-1 to press the wall face of the rotation vane 18. The tip ends of the elastic protrusion parts 30-1 may be constituted so as to only contact with or be apart from the wall face of the rotation vane 18 with a little gap.

The elastic protrusion parts 30-1 are protected from outside by the frame body 20b of the check valve 20, which is formed surrounding the periphery of the elastic protrusion parts 30-1, and thus external forces more than the elastic limit are not applied to them.

Figure 4:
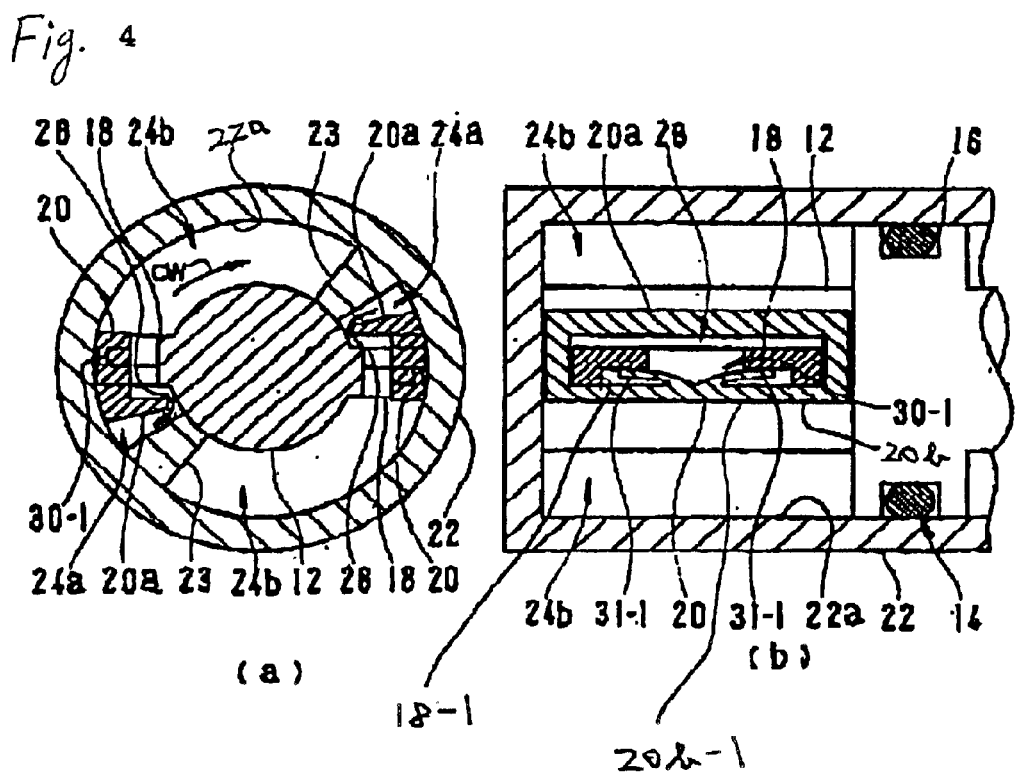

Regulating protrusion parts formed protruding to the frame body side, where the elastic protrusion parts 30-1 are provided, are formed at both end parts of the rotation vane 18 in the axial direction. When the check valve 20 is located at a position where the check valve 20 does not close the oil passage 28 by the oil flowing pressure as shown in FIG. 4, the regulating protrusion parts 18-1 keep a gap or some predetermined space between the rotation vane 18 and the frame body 20b where the elastic protrusion parts 30-1 are formed. This gap prevents the elastic protrusion parts 30-1 from being unnecessarily deformed by the rotation vane 18. Therefore, since the fatigue due to the repetitive operation of the elastic protrusion parts 30-1 is reduced, the damage of the elastic protrusion parts 30-1 is prevented and useful life can be improved. Furthermore, the maximum stress is applied to the elastic protrusion parts 30-1 only at the time of the rotation shaft 12 and the rotation vane 18 rotating in the slipping and not-braking direction. Accordingly, the act of resin creep due to high temperature is extremely reduced even when the elastic protrusion parts 30-1 are formed of a resin molding.

In the above-mentioned embodiment, the regulating protrusion parts 18-1 are formed protruded from the rotation vane 18. However, the regulating protrusion parts 18-1 may be formed protruded from the frame body 20b or the frame connecting part 20b-1. The elastic protrusion parts 30-1 may be formed on the rotation vane 18 and the frame connecting part 20b-1 may be abutted with the elastic protrusion parts.

Figure 3:
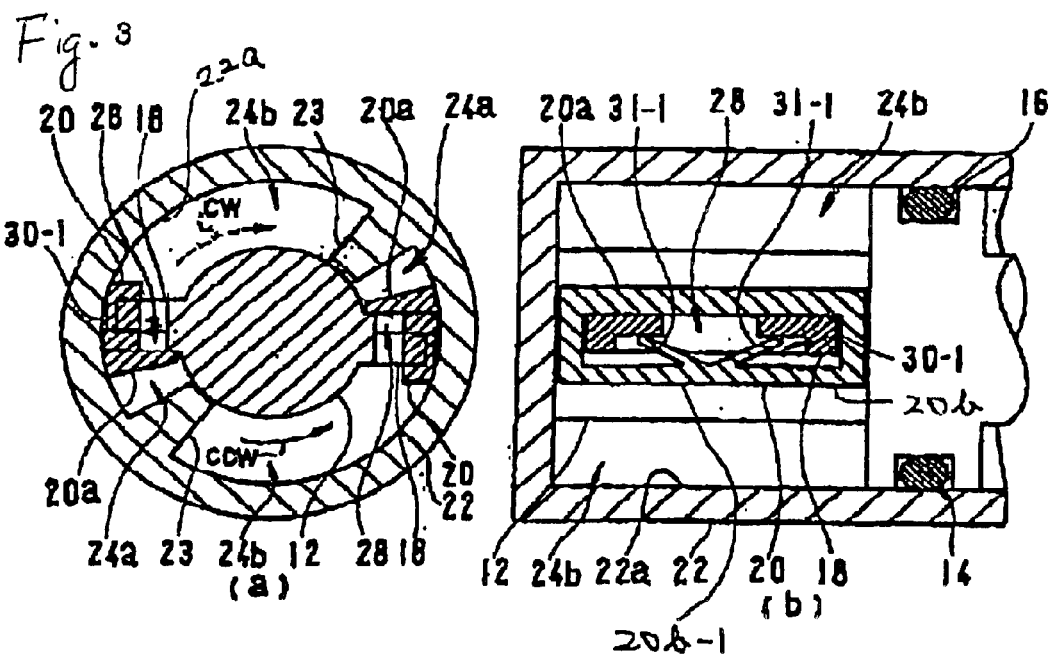

Next, the operation of the damper device in the present invention is described below with the reference to FIGS. 3 and 4. FIG. 3 a shows explanatory views of the damper device at a braking operation, wherein FIG. 3(a) shows a cross-sectional view perpendicular to the shaft and FIG. 3(b) shows a longitudinal sectional view along the shaft. FIG. 4 shows explanatory views of the damper device at a slipping operation, i.e., at a not-braking operation, wherein FIG. 4(a) shows a cross-sectional view perpendicular to the shaft and FIG. 4(b) shows a longitudinal sectional view along the shaft.

In FIG. 3(a), when the case 22 is fixed and the rotation shaft 12 is rotated in a CCW direction in the figure, the oil of the oil chamber 24a is pressurized to move to the oil chamber 24b. However, the opposing face put 20a of the check valve 20 abuts with the rotation vane 18 by the oil pressure and closes the oil passage 28. Therefore, the oil moves only through the gap formed between the cylindrical inner wall surface 22a of the case 22 and the outer periphery face of the check valve 20 and through the gap formed between the rotation shaft 12 and the case 22. Accordingly, the braking-force, i.e., damping-force is produced by flowing resistance of the oil and the toilet seat/seat lid (not shown) are slowly closed against their own weight.

When the rotation shaft 12 is turned in a CW direction in FIG. 4(a), the oil of the oil chamber 24b is pressurized to move to the oil chamber 24a. The feeler-shaped elastic protrusion part 30-1, which is the first embodiment of the elastic member, formed on the opposite side of the opposing face part 20a are elastically bent by the oil pressure. That is, the V-shaped leg section 31-1 is elastically bent and the check valve 20 is moved to the oil chamber 24a side. Consequently, the opposing face part 20a of the check valve 20 is allowed to move apart from the rotation vane 18 to open the oil passage 28 and the oil can flow through the oil passage 28.

As described above, the rotation of the rotation shaft 12 is swiftly performed in a slipping direction where the damper effect is not generated because the oil can flow from the oil chamber 24b to the oil chamber 24a without much resistance through the oil passage 28. Therefore, the toilet seat/seat lid can be lightly opened with a little force. When the rotation of the rotation shaft 12 is stopped, the opposing face part 20a of the check valve 20 is brought to closely contact with the rotation vane 18 by the energized force of the elastic protrusion parts 30-1, which is integrally formed in the check valve 20. This means that the slip angle (backlash) is extremely reduced at the time of the rotation in the opposite direction where the damper action is required. Consequently, the damper effect can be generated at once just after the beginning of the rotation in the opposite direction and the safety of the toilet seat/seat lid can be improved.

When the check valve 30 is constituted by molding of synthetic rain, the shape of the elastic protrusion parts 30-1 projected on the inner surface at the opposite side from the opposing face part 20a can be easily formed like a V-shaped leg section 31-1 on the frame connecting part 20b-1. The elastic energized force of the elastic protrusion parts 30-1 is necessary to be set weaker than the flowing pressure of the oil in the slipping direction.

Figure 5:
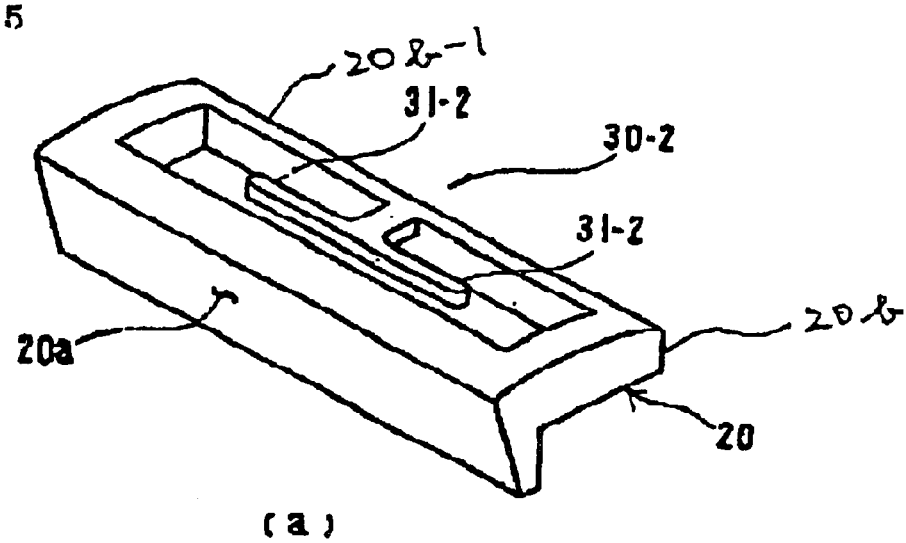
Figure 5:
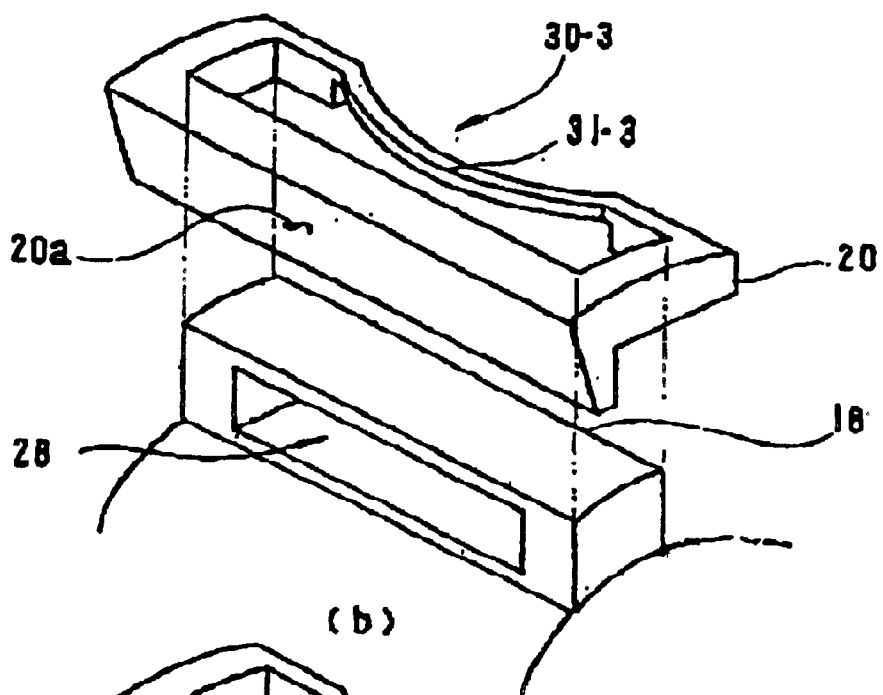
Figure 5:
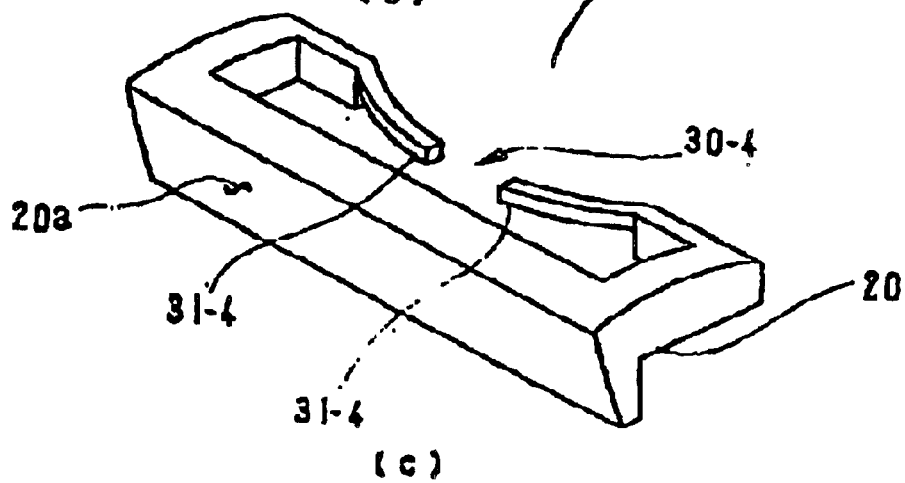

Alternative examples of the elastic protrusion parts 30-1 are shown in FIG. 5. FIG. 5(a) shows a second embodiment in which an elastic protrusion part 30-2 is formed in a T-shape instead of the V-shaped leg section 31-1. The frame connecting part 20b-1 connecting both end parts of the frame body 20b is formed on the opposite side to the opposing face part 20a. The T-shaped elastic protrusion part 30-2 is formed by integral molding in such a manner that two arms 31-2 are horizontally extended on the right and left sides from the center of the frame part 20b-1. When the rotation vane 18 is moved in the slipping direction, the rotation vane 18 abuts against the tip ends of the arms 31-2 to cause the elastic deformation of the arms 31-2 by the flowing pressure of the oil for allowing the fluid to flow through the oil passage 28.

FIG. 5(b) shows a third embodiment in which an elastic protrusion part 30-3 is formed in an arch-shape. The oil passage 28 formed on the tip portion of the rotation vane 18 is formed as an opening hole, which is different from the notch in the above-mentioned embodiment. The upper part above the opening hole of the rotation vane 18 abuts against the tip end of the arch part 31-3 of the elastic protrusion part 30-3 which causes the elastic deformation of the arch part 31-3. In other words, the arch part 31-3 bends a little in a somewhat flat shape.

FIG. 5(c) shows a fourth embodiment in which an elastic protrusion part 30-4 is formed in a two-bar shape, i.e., in a truncated chevron shape. The elastic protrusion part 30-4 is formed so as to oppose the rotation vane 18 as the third embodiment, small protrusions 31-4 in the truncated chevron shape are brought into contact with the upper part above the opening part of the rotation vane 18, As described above, the damper device according to the present invention is provided with the check valve mounted on the rotation vane, on which a small elastic protrusion part is formed. Therefore, the slip angle (backlash) of the damper device can be reduced without increasing component when the rotating direction is changed from the slipping direction to the braking direction. As a result, even when the toilet seat/seat lid is released at the time of being opened halfway, the toilet seat/seat lid is prevented from dropping and crashing against the toilet stool bowl because a damper function and a braking operation are effectively and quickly performed Such a damper device can be effectively used not only in a toilet seat/seat lid but also in a moving body such as a door closer or the lid of a trash box, which is connected by a hinge to swing lightly in one direction and slowly in the opposite direction.

The embodiments of the present invention are described above. However, needless to say, the present invention is not limited to the embodiments described above, and many modifications can be made without departing from the subject matter of the present invention.

For example, the shock valve 20 is preferably mounted in the tip part of the rotation vane 18 in consideration of its assembling efficiency. However, the check valve 20 may be mounted in the partition part 23 projected inside from the case 22 in a radial direction to expect the similar effect. Also, either of the rotation shaft 12 or the case 22 may be rotated.

As described above, a damper device is provided with a check valve arranged at a passage for a viscous fluid and an elastic member substantially energizing the check valve on a surface for braking the rotational speed of the rotation vane even at a time of stopping. As a result, a braking or damper action is executed almost without producing a slipping angle by backlash.

In the damper device described above, when the elastic member is integrally formed with the check valve by using synthetic resin with oil resistance and abrasion resistance, necessary components are reduced and assembling can be improved at a low cost.

Further, in the damper device according to the present invention, the check valve is constituted so as to interpose both side faces of the rotation vane, and the elastic member is formed between the rotation vane and inside the frame body of the check valve for restricting the rotational speed of the rotation vane. Therefore, the elastic member can be deformed within a limited range without receiving high pressure.

While the description above refers to particular embodiments of the invention, it will be understood that many modifications may be made without departing from the spirit thereof. The accompanying claims are intended to cover such modifications as would fall within the true scope and spirit of the present invention.

The disclosed embodiments are therefore to be considered in all respects as illustrative and not restrictive. The scope of the invention being indicated by the appended claims, rather than the foregoing description, and all changes which come within the meaning and range of equivalency of the claims are therefore intended to be embraced therein.

What is claimed is:

1. A rotary damper device comprises:

a case in which a viscous fluid is filled and sealed;

a rotation shaft relatively rotatably supported by the case;

a rotation vane formed protruded from the rotation shaft, a check valve mounted on a tip part of the rotation vane, wherein a passage where the viscous fluid passes through is formed in the rotation vane, the check valve is provided with an opposing face part facing the passage and a frame body interposed in the rotation vane; and an elastic member for energizing the opposing face part of the check valve for closing the passage of the rotation vane is formed in either the rotation vane or the opposite side of the frame body of the opposing face part, wherein the check valve is provided with the elastic member integrally formed at the frame body opposite the opposing face part so as to abut the rotation vane, and wherein a regulating part is formed between the rotation vane and the opposite side of the frame body to the opposing face part for restricting elastic deformation of the elastic member.

2. The rotary damper device according to claim 1, wherein the elastic member is formed at the frame body by synthetic resin with oil resistance and abrasion resistance.

3. The rotary damper device according to claim 1, wherein the energizing force of the elastic member is set to be smaller than the force of the viscous fluid pressing the opposing face part when the rotation vane is rotated in a non-damper-operating direction.

4. The rotary damper device according to claim 2, wherein the elastic member is formed in one of a feeler-shape, a T-shape, an arch shape, and a truncated chevron shape.

5. The rotary damper device according to claim 1, wherein the regulating part is formed of two protrusion parts protruded from the rotation vane and the elastic member is formed between the two protrusion parts.

6. The rotary damper device according to claim 1, wherein the regulating part is formed of two protrusion parts protruded from the frame body and the elastic member is formed between the two protrusion parts.

7. The rotary damper device according to claim 1, further comprising:

a cylindrical case;

a plurality of partition parts radially projected inside from a cylindrical inner wall surface of the case; and a plurality of rotation vanes disposed between the partition parts formed protruded radially from the rotation shaft;

wherein each of the rotation vanes is provided with the check valve which is substantially abutted with the cylindrical inner wall surface of the case and closes the passage by the rotation in a damper operating direction when the rotation shaft and the case are relatively rotated.

8. The rotary damper device according to claim 1, wherein the regulating part is provided such that the elastic member is elastically deformed within a predetermined range of elasticity.

* * * * *